Feb. 27, 1940.  A. B. POOLE  2,191,539
ROTARY MOTION TRANSLATING DEVICE
Filed June 29, 1939  2 Sheets-Sheet 1

Inventor
Arthur B. Poole
By
Attorneys

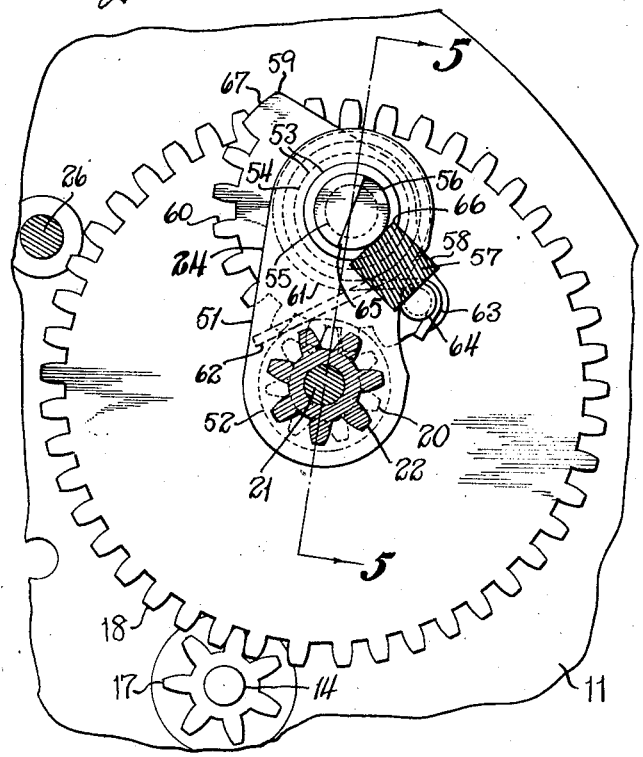

Patented Feb. 27, 1940

2,191,539

UNITED STATES PATENT OFFICE 2,191,539

ROTARY MOTION TRANSLATING DEVICE

Arthur B. Poole, Bristol, Conn., assignor to The E. Ingraham Company, Bristol, Conn., a corporation of Connecticut Application June 29, 1939, Serial No. 281,806

8 Claims. (Cl. 74—112)

This invention relates to improvements in rotary-motion translating devices of the character wherein a substantially-continuous rotary-motion may be translated into an intermittent or step-by-step rotary-motion. The devices of the present invention are primarily designed for effecting the periodic actuation of an electric-switch device, though also available for other uses, and constitute an improvement of my co-pending application Serial No. 216,177, filed June 27, 1938.

One of the objects of the present invention is to provide a superior rotary-motion translating device by means of which a relatively-slow substantially-continuous rotary-motion of a driving-member may be translated or converted into a relatively-rapid intermittent or step-by-step rotary-motion of a driven-member.

Another object is to provide a superior rotary-motion translating device characterized by fewness of parts and low cost of manufacture, resulting in a more compact structure, which is reliable in operation and not subject to derangement under operating conditions.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 3 is an enlarged fragmentary sectional view taken on the line 3—3 of Fig. 2 and illustrating the positions which the parts assume immediately after the completion of one of the step-by-step rotary movements of the stop-arm and its associated parts;

Fig. 4 is a view similar to Fig. 3 but showing the parts in the positions which they occupy at the instant before the unlatching action takes place to release the stop-arm and associated parts for one of its step-movements;

Fig. 5 is a broken sectional view taken on the line 5—5 of Fig. 3;

Fig. 8 is a perspective view of the latch-sector; and

Fig. 9 is a similar view of the latching-stud.

Figure 1:
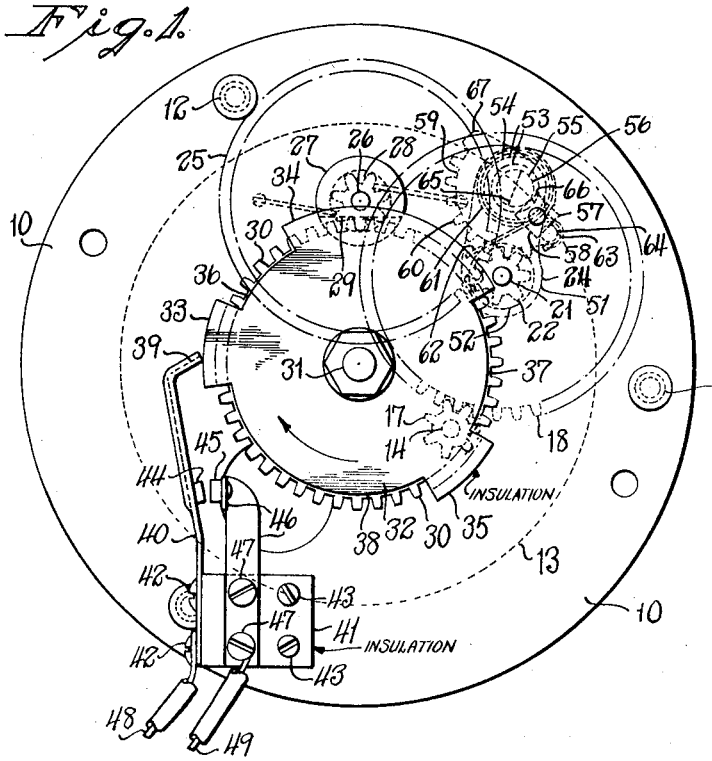
Fig. 1 is a view in front elevation of a rotary motion translating device constructed in accordance with the present invention.
Figure 7:
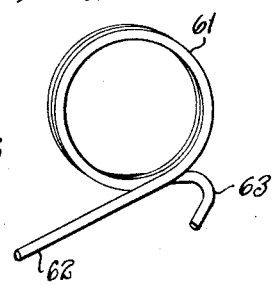
Fig. 7 is a perspective view of the transmitting-spring.

The particular rotary-motion translating device chosen for illustration of the present invention includes a front-plate 10 and a complemental back-plate 11 held in spaced relationship parallel with each other by three (more or less) pillars 12. Securely mounted against the rear face of the back-plate 11 is a synchronous electric motor-structure 13 (Fig. 2) requiring no detailed description herein other than to point out that, as shown, the said motor-structure is provided with a power-output shaft 14 and leads 15 and 16 which are adapted to be connected to any suitable source of alternating current in the usual manner of synchronous electric motors. The said synchronous electric motor-structure 13 imparts an accurately-timed rotational movement to the power-output shaft 14 and, therefore, serves in effect as timing-means which, obviously, may be replaced if desired by an ordinary spring-operated time-movement, or any other suitable time-mechanism.

The forward portion of the power-output shaft 14 has rigidly mounted thereon a driving-pinion 17 which meshes into and drives a gear-wheel 18. The gear-wheel 18 just referred to is staked, or otherwise rigidly secured, to the hub 19 of a sector-actuating pinion 20, as is particularly well shown in Fig. 5. The said sector-actuating pinion 20, together with the gear-wheel 18 carried thereby, is rigidly mounted upon a shaft 21, which latter bears at its front end in the front-plate 10 and bears at its rear end in the back-plate 11, with capacity for rotation.

Immediately forwardly of the sector-actuating pinion 20, the shaft 21 has mounted thereon, with freedom for rotation relative to the said shaft, an intermittent drive-pinion 22, the said drive-pinion being provided with a hub-portion 23 to which is rigidly staked, or otherwise secured, a stop-arm generally designated by the reference character 24.

The intermittent drive-pinion 22 is resiliently, or elastically, coupled to the sector-actuating pinion 20, and hence the gear-wheel 18 and drive-pinion 17, through a chain of parts to be hereinafter described, which enables the said gear-wheel 18 to rotate constantly and effect the intermittent turning movement of the said intermittent drive-pinion 22.

The intermittent drive-pinion 22 meshes into and drives an intermittent drive-wheel 25 rigidly mounted upon a shaft 26 journaled at its rear end in the back-plate 11 and at its forward end in a cup-shaped bearing 27 rigidly mounted on the front face of the front-plate 10 and extending forwardly therefrom. Immediately forwardly of the intermittent drive-wheel 25, the shaft 26 has rigidly mounted thereon for rotation therewith, a pinion 28 which extends forwardly through the front-plate 10 and is mainly housed within the cup-shaped bearing 27, as is particularly well shown in Fig. 2 of the drawings. The cup-shaped bearing 27 is cut away as at 29 to expose the pinion 28, so as to permit the latter to mesh with and drive an intermittently-driven gear-wheel 30 rigidly mounted upon an intermittently-driven control-shaft 31 journaled at its rear end in the back-plate 11, and intermediate its respective opposite ends journaled in the front-plate 10 through which it forwardly projects.

Rigidly attached to the projecting forward end of the control-shaft 31 just above referred to, is a control-wheel or member 32, preferably formed of insulating material. The control-wheel or member 32 just referred to is adapted to have imparted to it step-by-step rotational movement in the direction indicated by the arrow in Fig. 1, and, as the parts shown are proportioned, each step-by-step movement of the said control-wheel 32 will be substantially 10°, or one-thirty-sixth revolution for each step.

The said control-wheel 32 is provided upon its periphery with three (more or less) cam-lugs respectively numbered 33, 34 and 35 spaced from each other by an equal number of clearance-notches respectively numbered 36, 37 and 38. Each of the cam-lugs 33, 34 and 35 is adapted to sequentially coact with an inclined cam-finger 39 formed at the outer end of a resilient contact-arm 40. The said contact-arm 40 is secured to an insulating-block 41 by means of suitable screws 42—42, the said insulating-block 41 being, in turn, secured to the forward face of the front-plate 10 in any suitable manner such, for instance, as by means of screws 43—43.

About midway of its length, the resilient contact-arm 40 above referred to, carries a movable-contact 44 which is adapted to periodically engage with a similarly-shaped stationary-contact 45 carried at the inner end of a relatively-rigid contact-bracket 46 secured to the insulating-block 41 by means of screws 47—47. Respectively clamped against the outer end of the contact-arm 40 and the outer end of the contact-bracket 46 by their respective outer screws 42 and 47 are lead-wires 48 and 49 which extend to a device which it is desired to electrically control. The device to be controlled may, of course, assume a wide variety of forms and is not per se involved in the present invention, but by way of illustration it may be considered to be an automatic washing machine or the like.

Returning now to the stop-arm 24, it will be noted by reference to Fig. 5, that the said stop-arm includes two complemental plate-like arms 50 and 51 held in spaced relationship parallel to each other at their inner ends by a spacing-washer 52 rigidly mounted, together with the inner ends of the arms 50 and 51, upon the hub 23 of the intermittent drive-pinion 22, as is clearly shown in the figure just referred to. At the outer end of the stop-arm 24, there is provided a bushing 53 rigidly secured to the arms 50 and 51 and which is formed with a hub-like portion 54 intermediate the opposite ends thereof, the said hub-like portion being interposed between the arms 50 and 51, to thereby space the outer ends of the said arms from each other in a manner similar to the spacing-washer 52 before referred to.

It will be noted that the bushing 53 carried at the outer end of the stop-arm 24 mounts with freedom for turning-movement therein, a latching-stud 55 having a semi-cylindrical latching-head 56 which projects forwardly from the front-face of the arm 51 of the said stop-arm 24. The latching-head 56 of the latching-stud 55 projects forwardly into position to releasably engage a latching-abutment 57 constituting the head portion of an abutment-stud 58 riveted to the front-plate 10 and having the said latching-abutment 57 extending rearwardly therefrom.

The reduced rear end of the latching-stud 55 projects beyond the bushing 53 and has staked or otherwise secured thereto a latch-sector 59 having peripheral gear-teeth 60 arranged concentrically with the latching-stud 55 and meshing with the sector-actuating pinion 20 before referred to.

As shown in the drawings, an intermittent-movement-transmitting spring 61 is interposed between the latch-sector 59 and the spacing-washer 52 for the purpose of transmitting an intermittent or step-by-step movement from the constantly rotating sector-actuating pinion 20 to the intermittent drive-pinion 22 and hence through the chain of parts 25, 28 and 30 to the control-wheel 32. The transmitting-spring 61 is of the torsion-spring type and has its convolutions encircling the hub-like portion 54 of the bushing 53 at the outer end of the stop-arm 24. As shown particularly well in Figs. 3 and 4, the transmitting-spring 61 has one of its ends 62 seated against the outer periphery of the spacing-washer 52 while the opposite end of the said spring is provided with a hook 63, the said hook being attached to a pin 64 forwardly projecting from the latch-sector 59.

Figure 2:
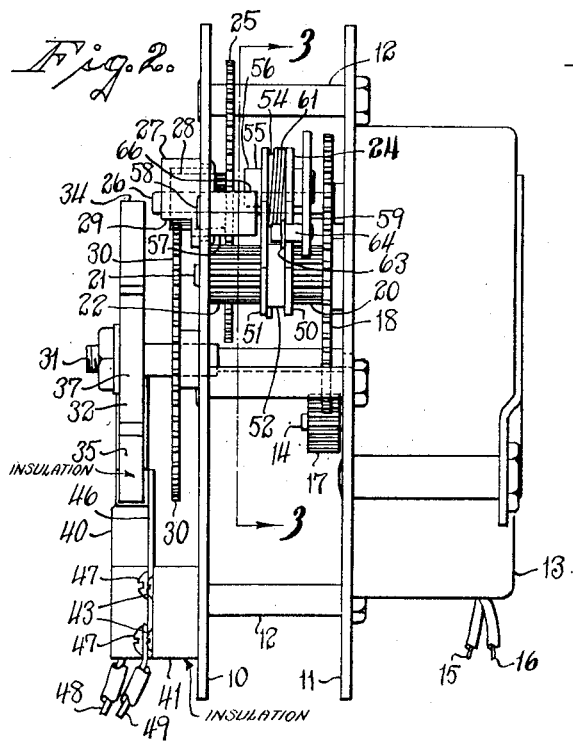
Fig. 2 is a side-edge view thereof.
Figure 6:
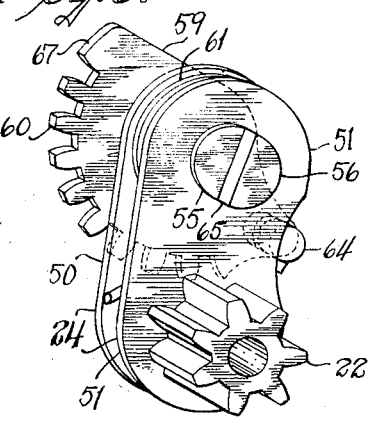
Fig. 6 is a perspective view of the unit comprising the stop-arm, latch-sector, latching-stud, and intermittent drive-pinion.

For the purpose of making clear the operation of the device illustrated in the drawings, let it be assumed that the parts are in the positions in which they are illustrated in Figs. 1 to 3 inclusive, and that the leads 15 and 16 of the synchronous electric motor-structure are connected to a supply of alternating current. Under the conditions just referred to, the driving-pinion 17 will effect the continuous rotation of the gear-wheel 18 and the parts rigidly connected thereto, that is, the sector-actuating pinion 20 and the shaft 21.

It may here be noted that the transmitting-spring 61 is placed under tension when the unit comprising the said spring, stop-arm, latch-sector, latching-stud and intermittent drive-pinion are mounted upon the shaft 21. With the spring 61 under tension, as just described, the said spring will tend to urge the stop-arm 24 to turn in a clockwise direction as viewed in Figs. 3 and 4, the said stop-arm, however, being prevented from turning in the manner just referred to by the engagement of the semi-cylindrical latching-head 56 of the latching-stud 55 with the latching-abutment 57.

As the gear-wheel 18 continues to turn, the sector-actuating pinion 20 will turn the latch-sector 59 in a counter-clockwise direction with reference to the stop-arm 24 by which it is carried, and thus effect the similar counterclockwise turning of the semi-cylindrical latching-head 56. This turning movement of the latch-sector 59, as just described, will cause the pin 64 carried thereby to move the hook end 63 of the transmitting-spring 61 about the latching-stud 55 as a center to thus effect the further tensioning of the said transmitting-spring. Ultimately, the transmitting-spring 61 will have been tensioned substantially to its maximum tension and the corner 65 of the latching-head 56 will come into registration with the uppermost corner 66 of the latching-abutment 57 as viewed in Fig. 4 of the drawings.

The slight further counterclockwise turning movement of the latch-sector 59 and hence the latching-head 56 will clear the corner 65 of the said latching-head from the corner 66 of the latching-abutment 57, whereupon the transmitting-spring 61 will act (while also bodily moving about the shaft 21 as a center) to rapidly swing or snap the stop-arm 24 and the parts carried thereby one completely revolution in a clockwise direction.

During the rapid swinging movement of the stop-arm 24 and associated parts as just above referred to, the latch-sector 59 (while also bodily moving) will be turned in a clockwise direction by the engagement of its teeth 60 with the sector-actuating pinion 20. The result of the latch-sector moving as just described, causes the latching-head 56 to also turn in a clockwise direction so that at the completion of one complete turn of the stop-arm, the latching-head 56 will have again assumed the position in which it is illustrated in Fig. 3, to thereby engage the latching-abutment 57 to thus check the turning movement of the stop-arm 24 and the parts carried thereby, in which position the said parts are shown in Fig. 3.

When the stop-arm 24 snaps around in a clockwise direction as just above described, under the tension of the transmitting-spring 61, the intermittent drive-pinion 22 which is rigidly coupled to the inner end of the said stop-arm, will also have imparted to it one complete revolution with the result that the intermittent drive-wheel 25 will be turned one-sixth of a revolution, and hence through the pinion 28 and the intermittently-driven gear-wheel 30 similarly will turn the control-shaft 31 and the control-wheel 32.

The turning movement thus imparted to the control-wheel 32 will serve to cause the cam-lug 33 to ride out of engagement with the cam-finger 39 of the contact-arm 40 and bring the clearance-notch 38 into registration with the said cam-finger 39. This movement of the control-wheel 32 will thus permit the contact-arm 40 to move laterally to bring its contact 44 into engagement with the stationary contact 45 and thus complete an electrical circuit between the two lead-wires 48 and 49 and so effect the actuation of such electrical device as may be connected to the said lead-wires 48 and 49.

The cycle of operation above referred to, will be periodically repeated with the result that the control-wheel or member 32 will, at desired intervals, have successive step-by-step turning movement imparted to it to effect the opening and closing of the contacts 44 and 45. It will be understood that the number of cam-lugs or their equivalent upon the control-wheel 32 will be in accord with the action which it is desired to have the said control-wheel effect.

It will thus be seen from the foregoing that the constant rotation of the driving-pinion 17 will be converted into a series of very rapid step-by-step movements of the control-wheel or its equivalent. Thus, the opening and closing of the contacts 44 and 45 or their equivalents will be accomplished in a very rapid manner minimizing sparking and other objectionable action.

It will also be seen by reference to the drawings that the transmitting-spring 61 by being mounted at the outer end of the stop-arm 24 and movable bodily therewith about the shaft 21, the ends of the said spring need be flexed approximately but 90° to tension the spring sufficiently for moving the stop-arm 24 one complete revolution.

The construction and arrangement of parts of the present invention is such as to continue the successive openings and closings of the contacts 44 and 45 or their equivalents in the event of the breakage or other failure of the transmitting-spring 61, though not with the desired rapidity before referred to. For this purpose the gear teeth 60 of the latch-sector 59 terminate short of one edge of the said latch-sector so as to leave thereon a driving-abutment 67, the said driving-abutment being adapted upon failure of the transmitting-spring 61 to jam against the teeth of the sector-actuating pinion 20 so as to effect a positive drive-connection between the said pinion and the stop-arm 24 and hence the control-wheel 32.

It will be noted by reference to Fig. 4, in particular, that the driving-abutment 67 of the latch-sector 59 does not engage with the teeth of the sector-actuating pinion until after the corner 65 of the latching-head 56 has cleared the corner 66 of the latching-abutment 57, and only then does the driving-abutment 67 engage with the teeth of the sector-actuating pinion in the event that the transmitting-spring 61 failed to function. As before explained, the instant that the corner 65 clears the corner 66 of the latching-abutment 57, the transmitting-spring 61 will under ordinary conditions rapidly snap the stop-arm 24 around one revolution, the said arm being arrested by the latching-head 56 engaging the latching-abutment 57.

Under ordinary conditions the stop-arm 24 will be snapped around one revolution by the transmitting-spring 61 as just described, and the driving-abutment 67 does not function at all, but in the event, however, of the transmitting-spring 61 or its equivalent being broken or otherwise failing to operate, the said driving-abutment 67 will be brought into jamming engagement with the teeth of the sector-actuating pinion 20 to thus cause the latter to slowly but surely rotate the said stop-arm 24 through the intermediary of the latch-sector 59 with the result that the control-wheel 32 will be continuously driven rather than being driven intermittently or in step-by-step movements as under ordinary operating conditions.

It will thus be seen from the foregoing that provision is made for translating a relatively-slow substantially-continuous movement into a relatively-rapid step-by-step movement and that the present invention accomplishes this transition of continuous movement into step-by-step movement in an efficient manner employing fewness of parts which is conducive for low cost of manufacture. It will also be seen that provision is made whereby in the event of the failure of the transmitting-springs or their equivalent, the devices will continue to function, automatically resorting to the slow but positive movement of the control-wheel.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A rotary motion translating device, including in combination: a substantially-constantly-rotating driving-member; an intermittently-rotating driven-member; a stop-abutment; and intermittently-acting coupling-means operatively interposed between the said driving-member and the said driven-member for causing the former to intermittently actuate the latter, and comprising: a rotary-arm mounted for step-by-step movement, a rotary latch-member carried by the said rotary-arm at a point eccentric with respect to the center of rotation of the said rotary-arm in position to releasably engage with the said stop-abutment, an energy-storing spring carried by the said rotary-arm and bodily movable therewith around the center of rotation of the said rotary-arm and tensioned by the said driving-member during the intervals between the successive intermittent movements of the said driven-member, and latch-releasing means operatively connected to both the said driving-member and the said rotary latch-member for turning the latter out of engagement with the said stop-abutment to release the said rotary-arm to the action of the said energy-storing spring to effect the movement of the said driven-member and the bodily movement of the said energy-storing spring itself around the rotational center of the said rotary-arm.

2. A rotary motion translating device, including in combination: a substantially-constantly-rotating driving-member; an intermittently-rotating driven-member; a stop-abutment; and intermittently-acting coupling-means operatively interposed between the said driving-member and the said driven-member for causing the former to intermittently actuate the latter, and comprising: a rotary-arm mounted for step-by-step movement, a rotary latch-member carried by the said rotary-arm at a point eccentric with respect to the center of rotation of the said rotary-arm in position to releasably engage with the said stop-abutment, an energy-storing spring having a portion extending around the rotational center of the said rotary latch-member and bodily movable with the said rotary-arm around the center of rotation of the latter and tensioned by the said driving-member during the intervals between the successive intermittent movements of the said driven-member, and latch-releasing means operatively connected to both the said driving-member and the said rotary latch-member for turning the latter out of engagement with the said stop-abutment to release the said rotary-arm to the action of the said energy-storing spring to effect the movement of the said driven-member and the bodily movement of the said energy-storing spring itself around the rotational center of the said rotary-arm.

3. A rotary motion translating device, including in combination: a substantially-constantly-rotating driving-member; an intermittently-rotating driven-member; a stop-abutment; and intermittently-acting coupling-means operatively interposed between the said driving-member and the said driven-member for causing the former to intermittently actuate the latter, and comprising: a rotary-arm having two substantially-parallel spaced-apart plates and mounted for step-by-step movement, a rotary latch-member carried by the said rotary-arm at a point eccentric with respect to the center of rotation of the said rotary-arm in position to releasably engage with the said stop-abutment, an energy-storing spring carried by the said rotary-arm for bodily movement therewith and having a portion positioned in the space between the two substantially-parallel spaced-apart plates of the said rotary-arm, and latch-releasing means operatively connected to both the said driving-member and the said rotary latch-member for turning the latter out of engagement with the said stop-abutment to release the said rotary-arm to the action of the said energy-storing spring to effect the movement of the said driven-member and the bodily movement of the said energy-storing spring itself around the rotational center of the said rotary-arm.

4. A rotary motion translating device, including in combination: a substantially-constantly-rotating driving-member; an intermittently-rotating driven-member; a stop-abutment; and intermittently-acting coupling-means operatively interposed between the said driving-member and the said driven-member for causing the former to intermittently actuate the latter, and comprising: a rotary-arm having two substantially-parallel spaced-apart plates and mounted for step-by-step movement, a rotary latch-member carried by the said rotary-arm at a point eccentric with respect to the center of rotation of the said rotary-arm in position to releasably engage with the said stop-abutment, an energy-storing spring having a portion encircling the said rotary latch-member and positioned between the respective spaced-apart plates of the said rotary-arm, and latch-releasing means operatively connected to both the said driving-member and the said rotary latch-member for turning the latter out of engagement with the said stop-abutment to release the said rotary-arm to the action of the said energy-storing spring to effect the movement of the said driven-member and the bodily movement of the said energy-storing spring itself around the rotational center of the said rotary-arm.

5. A rotary motion translating device, including in combination: a substantially-constantly-rotating driving gear-member; an intermittently-rotating driven-member; a stop-abutment; and intermittently-acting coupling-means operatively interposed between the said driving gear-member and the said driven-member for causing the former to intermittently actuate the latter, and comprising: a rotary-arm mounted for step-by-step movement, a rotary latch-member carried by the said rotary-arm at a point eccentric with respect to the center of rotation of the said rotary-arm in position to releasably engage with the said stop-abutment, an energy-storing spring carried by the said rotary-arm and bodily movable therewith around the center of rotation of the said rotary-arm and tensioned by the said driving-member, and a latch-releasing member connected to the said rotary latch-member for turning the same and having teeth engaging with the said driving gear-member for being turned thereby to unlatch the said rotary latch-member from the said stop-abutment to release the said rotary-arm to the action of the said energy-storing spring to effect the movement of the said driven-member and the bodily movement of the said energy-storing spring itself around the rotational center of the said rotary-arm.

6. A rotary motion translating device, including in combination: a substantially-constantlyrotating driving gear-member; an intermittently-rotating driven member; a stop-abutment; and intermittently-acting coupling-means operatively interposed between the said driving gear-member and the said driven-member for causing the former to intermittently actuate the latter, and comprising: a rotary-arm mounted for step-by-step movement, a rotary latch-member carried by the said rotary-arm at a point eccentric with respect to the center of rotation of the said rotary-arm in position to releasably engage with the said stop-abutment, an energy-storing spring having a portion extending around the rotational center of the said rotary latch-member and bodily movable with the said rotary-arm around the center of rotation of the latter, and a latch-releasing member connected to the said rotary latch-member for turning the same and having teeth engaging with the said driving gear-member for being turned thereby to unlatch the said rotary latch-member from the said stop-abutment to release the said rotary-arm to the action of the said energy-storing spring to effect the movement of the said driven-member and the bodily movement of the said energy-storing spring itself around the rotational center of the said rotary-arm.

7. A rotary motion translating device, including in combination: a substantially-constantly-rotating driving gear-member; an intermittently-rotating driven-member; a stop-abutment; and intermittently-acting coupling-means operatively interposed between the said driving gear-member and the said driven-member for causing the former to intermittently actuate the latter, and comprising: a rotary-arm mounted for step-by-step movement and having two substantially-parallel spaced-apart plates, a rotary latch-member journaled in both of the plates of the said rotary-arm at a point eccentric with respect to the center of rotation of the said rotary-arm in position to releasably engage with the said stop-abutment, an energy-storing spring carried by the said rotary-arm for bodily movement therewith and having a portion positioned in the space between the two substantially-parallel spaced-apart plates of the said rotary-arm, and a latch-releasing member connected to the said rotary latch-member for turning the same and having teeth engaging with the said driving gear-member for being turned thereby to unlatch the said rotary latch-member from the said stop-abutment to release the said rotary-arm to the action of the said energy-storing spring to effect the movement of the said driven-member and the bodily movement of the said energy-storing spring itself around the rotational center of the said rotary-arm.

8. A rotary motion translating device, including in combination: a substantially-constantly-rotating driving gear-member; an intermittently-rotating driven-member; a stop-abutment; and intermittently-acting coupling-means operatively interposed between the said driving gear-member and the said driven-member for causing the former to intermittently actuate the latter, and comprising: a rotary-arm mounted for step-by-step movement and having two substantially-parallel spaced-apart plates, a rotary latch-member journaled in both of the plates of the said rotary-arm at a point eccentric with respect to the center of rotation of the said rotary-arm in position to releasably engage with the said stop-abutment, an energy-storing spring carried by the said rotary-arm for bodily movement therewith and having a portion encircling the said rotary latch-member intermediate the two plates of the said rotary-arm, and a latch-releasing member connected to the said rotary latch-member for turning the same and having teeth engaging with the said driving gear-member for being turned thereby to unlatch the said rotary latch-member from the said stop-abutment to release the said rotary-arm to the action of the said energy-storing spring to effect the movement of the said driven-member and the bodily movement of the said energy-storing spring itself around the rotational center of the said rotary-arm.

ARTHUR B. POOLE.